(12) United States Patent
Azuma

(10) Patent No.: US 7,157,871 B2
(45) Date of Patent: Jan. 2, 2007

(54) INTERMITTENT DRIVE CONTROL APPARATUS OF MOTOR

(75) Inventor: Kazuki Azuma, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1469 days.

(21) Appl. No.: 09/811,634

(22) Filed: Mar. 20, 2001

(65) Prior Publication Data

US 2002/0009288 A1    Jan. 24, 2002

Related U.S. Application Data

(63) Continuation of application No. PCT/JP01/00211, filed on Jan. 16, 2001.

(30) Foreign Application Priority Data

Jan. 19, 2000  (JP) ............................ 2000-010917

(51) Int. Cl.
*H02P 3/00* (2006.01)
*H02P 6/24* (2006.01)

(52) U.S. Cl. ............... 318/258; 318/255; 318/268; 318/269; 318/364; 318/373; 318/54; 318/55; 318/56; 318/63; 318/65

(58) Field of Classification Search ............... 318/255, 318/258, 269, 364, 373, 54, 55, 56, 63, 65
See application file for complete search history.

(56) References Cited

U.S. PATENT DOCUMENTS

| | | | |
|---|---|---|---|
| 4,511,937 A | | 4/1985 | Guerrero |
| 4,611,252 A | * | 9/1986 | Igata et al. .................... 386/74 |
| 4,896,225 A | * | 1/1990 | Nakatsuyama et al. .. 360/73.06 |
| 4,943,872 A | * | 7/1990 | Yamazaki ....................... 360/8 |
| 5,045,957 A | * | 9/1991 | Doutsubo ..................... 360/71 |
| 5,214,515 A | * | 5/1993 | Inoue et al. .................. 386/72 |
| 5,250,883 A | * | 10/1993 | Okada ......................... 318/494 |
| 5,319,499 A | * | 6/1994 | Kim et al. ..................... 386/72 |
| 5,604,652 A | * | 2/1997 | Nishida et al. ........... 360/73.14 |
| 5,715,157 A | | 2/1998 | Kuehn |
| 5,909,097 A | * | 6/1999 | Rothamel et al. ............ 318/561 |
| 5,912,781 A | * | 6/1999 | Imai ......................... 360/73.14 |
| 6,466,390 B1 | * | 10/2002 | Watanabe ................... 360/74.1 |
| 6,624,959 B1 | * | 9/2003 | Takayama ..................... 360/69 |

FOREIGN PATENT DOCUMENTS

| | | |
|---|---|---|
| EP | 0 241 561 | 10/1987 |
| GB | 2 081 533 | 2/1982 |

(Continued)

OTHER PUBLICATIONS

R. W. Van Pelt, IEEE Transactions on Magnetics, vol. MAG 17, No. 4, pp. 1435-1437, XP-002218343, "Microprocessor Controlled Tape Motion", Jul. 1981.

*Primary Examiner*—Rita Leykin
(74) *Attorney, Agent, or Firm*—Oblon, Spivak, McClelland, Maier & Neustadt, P.C.

(57) ABSTRACT

Rotation of a capstan motor is detected by a frequency detector, and supplied to a CPU as a rotation detection signal CFG. The CPU derives a period of the rotation detection signal CFG, calculates an average rotational speed of the capstan motor on the basis of the derived period, derives an attenuation value of the rotational speed on the basis of the calculated average speed, and thereby sets a braking time interval. As a result, calculation of the braking time using a highly accurate zero point detection with a frequency detector of one system becomes possible. The apparatus scale can be reduced.

16 Claims, 4 Drawing Sheets

FOREIGN PATENT DOCUMENTS

| | | |
|---|---|---|
| JP | 62-247777 | 10/1987 |
| JP | 64-069278 | 3/1989 |
| JP | 6-054569 | 2/1994 |
| WO | WO 94/15337 | 7/1994 |

* cited by examiner

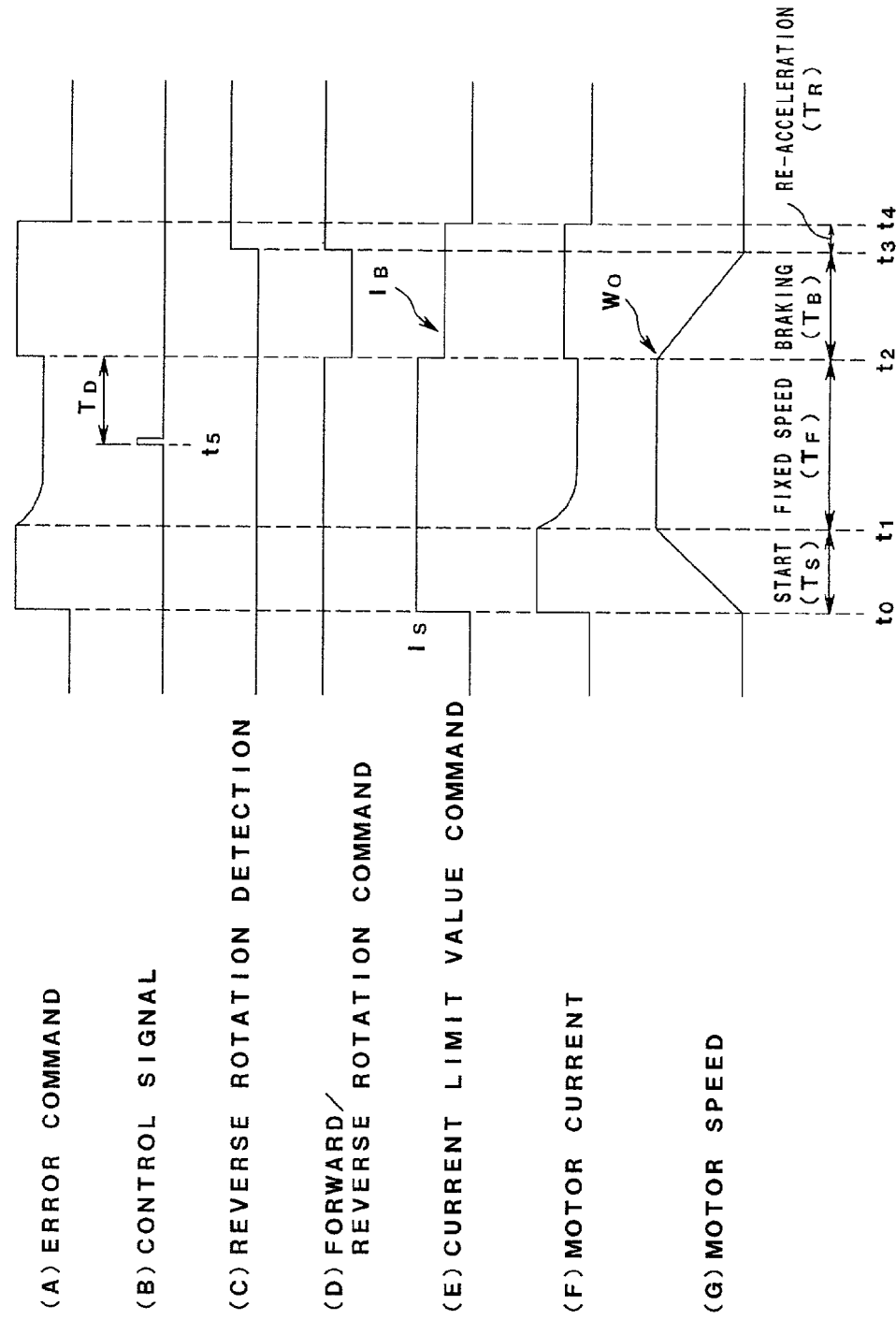

INTERMITTENT DRIVE CONTROL APPARATUS OF MOTOR

BACKGROUND OF THE INVENTION

1. Field of the Invention

The present invention relates to an intermittent drive control apparatus of motor suitable for intermittent drive of a capstan motor of a video tape recorder (VTR).

2. Related Art Statement

In the conventional VTR of helical scanning scheme, there is sometimes adopted a slow motion playback system using such an intermittent slow scheme that tape stop and tape drive are alternately repeated. In this scheme, the capstan motor is rotated intermittently and tape is fed intermittently. Slow motion playback with noise occurrence suppressed is possible in this scheme.

Intermittent feed for such slow motion playback will now be described.

For intermittent feed of tape, a forward/reverse rotation command is supplied to a motor drive circuit of the capstan motor. In addition, since the motor is started until a predetermined rotational speed is attained, a current limit command is given so as to raise the rotational speed rectilinearly. Next when the motor attains a predetermined rotational speed, to maintain the speed, a speed control is performed by an error command. If a reproduced control pulse is obtained in the middle of an interval of this fixed speed, a reverse rotation command is given after a preset tracking adjustment time interval and a braking current is supplied. The braking current is also kept at a fixed value by a current limit command so as to lower the rotational speed of the motor at a fixed ratio. The rotational speed of the motor gradually lowers, and the rotation becomes zero. If rotation in the reverse rotation direction is subsequently detected, then a forward rotation command is given. As a result, continuation of reversal caused by inertia of the motor is prevented. (This is called re-acceleration.) Complete stop is thus obtained.

The intermittent drive of the capstan is implemented by the above described system. Slow motion playback is conducted so as not to generate noise. In the above described system, however, it is necessary to finish the braking and conduct re-acceleration operation at a time point when the rotation becomes zero. When an accuracy in detection of this zero point is low, tape is damaged at a time of tape travelling. Therefore, zero point detection is conducted by detecting a phase relation by means of two capstan rotational speed detection signals differing in phase as means for improving the zero point detection accuracy.

FIG. 3 shows a related technique of a VTR which makes intermittent feed possible. FIG. 3 is a block diagram showing invention disclosed in Japanese Patent Application Laid-Open 7-59389.

A capstan shaft 11 of the VTR is capable of pressing magnetic tape 13 against a pinch roller 12 and driving the magnetic tape 13 to make it travel. The capstan shaft 11 is integral with a rotary shaft of the capstan motor 15. Rotation of the capstan motor 15 is detected by bi-phase frequency detectors (FGa, FGb).

The frequency detectors FGa and FGb are coils disposed at such a distance as to generate a phase difference of 90 degrees between them. Detected outputs of the frequency detectors FGa and FGb are supplied to waveform shaping circuits 16 and 17, respectively. For a control track of tape 13, a control head 18 is disposed. Thereby, a control signal can be recorded and reproduced. A reproduced control signal is inputted to a waveform shaping circuit 19.

The detection signal FGa shaped in waveform to a rectangular wave by the waveform shaping circuit 16 is supplied to a speed detector 21, and used to detect the rotational speed of the capstan motor 15. The detection signals FGa and FGb of rectangular waves outputted from the waveform shaping circuits 16 and 17 are supplied to a rotational direction detector 22, and used to detect the rotational direction of the capstan motor 15.

A speed error signal fed from the speed detector 21 and a reverse rotation detection signal fed from the rotational direction detector 22 are supplied to a capstan controller 23. In addition, a control signal fed from the waveform shaping circuit 19 and tracking information fed from an external memory or the like are also inputted to the capstan controller 23.

By using these kinds of input information, the capstan controller 23 controls a motor current of a motor drive circuit 24 and drives the capstan motor 15 intermittently. Control information supplied to the motor drive circuit 24 includes forward/reverse rotation command information, current limit value command information, and error information.

FIGS. 4A–4G show signal waveforms of various locations at the time of intermittent drive.

It is now assumed that start of the motor is begun at time t0. At this time, a motor current FIG. 4F is supplied with a fixed value by current limit value command information FIG. 4E so as to increase the rotation at desired acceleration. A motor speed FIG. 4G increases at fixed acceleration as shown in FIG. 4G. When the motor speed FIG. 4G arrives at a desired value W0 (time t1), rotational speed control is applied in order to keep the fixed speed.

An interval between time t0 and t1 is called start interval (a start time interval is Ts). Shift to the fixed speed state is conducted on the basis of the speed information fed from the speed detector 21, and error command information FIG. 4A is supplied to the motor drive circuit 24. As a result, the motor current changes, resulting in a fixed speed state.

Maintenance of the constant speed state is achieved by conducting speed control so as to make the frequency of the rotation detection output (FGa) constant. This interval (interval between the time t1 and time t2) is called fixed speed interval (where a fixed speed time interval is TF).

When the control signal FIG. 4B is detected in the fixed speed interval (at, for example, t5), the speed W0 is kept further for a time interval (TD) on the basis of tracking information, and then shift to braking operation is conducted (time t2). The braking operation is conducted by supplying forward/reverse rotation command information FIG. 4D to the motor drive circuit 24 and switching the motor current over to an opposite direction. At this time, the motor current FIG. 4F is prescribed (to become IB in FIG. 4F) by the current limit value command information FIG. 4E so as to decrease the rotational speed of the motor at a fixed rate. If braking operation were kept, the motor would conduct reverse rotation operation after stop. The moment an opposite direction rotation detection output (reverse rotation detection signal FIG. 4C is obtained from the rotation direction detector 22 (at time t3), therefore, the forward/reverse rotation command FIG. 4D is changed so as to order a forward rotation. At the same time, a current is applied in the forward rotation direction again for a short time in order to cancel the rotational inertia of the motor. As a result, rotatory power of the forward rotation direction is generated. The reverse rotation energy is thus absorbed completely, and complete stop is obtained. This is so-called re-acceleration.

A re-acceleration time interval is TR, which is an interval between t3 and t4. (As a matter of fact, the motor is in the stop state.)

For implementing such accurate intermittent drive as not to generate noise on the screen, as above-described, it is necessary to conduct detection of timing for execution of re-acceleration, i.e., detection such timing that the rotation becomes zero (zero point detection) at high accuracy. For this reason, two capstan rotation detection signals having a phase difference of 90 degrees are used in an example of the aforementioned Japanese Patent Application Laid-Open 7-59389.

In other words, in the forward rotation, FGb is detected 90 degrees behind the rotation detection signal FGa. On the other hand, in the reverse rotation direction, FGb is detected 90 degrees before the rotation detection signal FGa. By detecting s phase relation between FGa and FGb, therefore, it becomes possible to determine whether the motor is conducting the forward rotation or the reverse rotation at the present time. It thus becomes possible to detect a zero point at high accuracy.

In this case, however, two rotation detection systems, i.e., two motor speed detectors, two detection signal amplifiers and two wave form shaping circuits are needed, resulting in a remarkably increased cost.

In this way, in an intermittent drive control apparatus of motor adopted in an intermittent slow playback system, it is necessary to improve the zero point detection accuracy. Therefore, zero point detection is conducted by using two capstan rotational speed detection signals differing in phase. Accordingly, two motor speed detectors, two detection signal amplifiers and two wave form shaping circuits are needed. This results in a problem that the apparatus scale is large and the cost is increased.

Therefore, an object of the present invention is to provide an intermittent drive control apparatus of motor capable of reducing an apparatus scale and suppressing a cost increase by making possible high accuracy zero point detection using only one capstan rotation detection signal.

SUMMARY OF INVENTION

In accordance with the present invention, an intermittent drive control apparatus of a motor includes: motor drive means capable of driving a motor intermittently by selectively supplying current of a forward rotation direction and current of a reverse rotation direction to the motor; rotation detection means which generate a rotation detection signals at a frequency proportionate to rotation of the motor; and braking time interval calculation means which, when the motor drive means is controlled to supply the current of the forward rotation direction and the current of the reverse rotation direction to the motor, thereby braking and stopping the rotation of the motor, measures a period of the rotation detection signals to calculate a speed deceleration rate of the motor, and calculate a braking time between braking start and stop of the rotation of the motor based on a rotational speed of the motor at time of the braking start and the calculated speed deceleration rate, so that the motor drive means is controlled based on the calculated braking time.

When supplying a current of an opposite direction to the motor, thereby braking the rotation of the motor, and stopping the motor for the purpose of intermittent drive, the braking time calculation means included in the intermittent drive control apparatus according to the present invention measures a period of rotation detection signals fed from the rotation detection means, and calculates a speed deceleration rate of the motor. In addition, the braking time calculation means calculates a braking time on the basis of a rotational speed of the motor at the time of braking start and the speed deceleration rate, so that the motor drive means is controlled on the basis of the calculated braking time.

BRIEF DESCRIPTION OF THE DRAWINGS

A more complete application of the invention and many of the attendant advantages thereof will be readily obtained as the same becomes better understood by reference to the following detailed description when considered in connection with the accompanying drawings, wherein:

FIG. 4A–4G are timing charts showing operation of the related technique of FIG. 3.

DETAILED DESCRIPTION OF THE PREFERRED EMBODIMENTS

Other features of the invention will becomes apparent in the course of the following descriptions of the exemplary embodiments which are give for illustration of the invention and are not intended to be limiting thereof.

Figure 1:
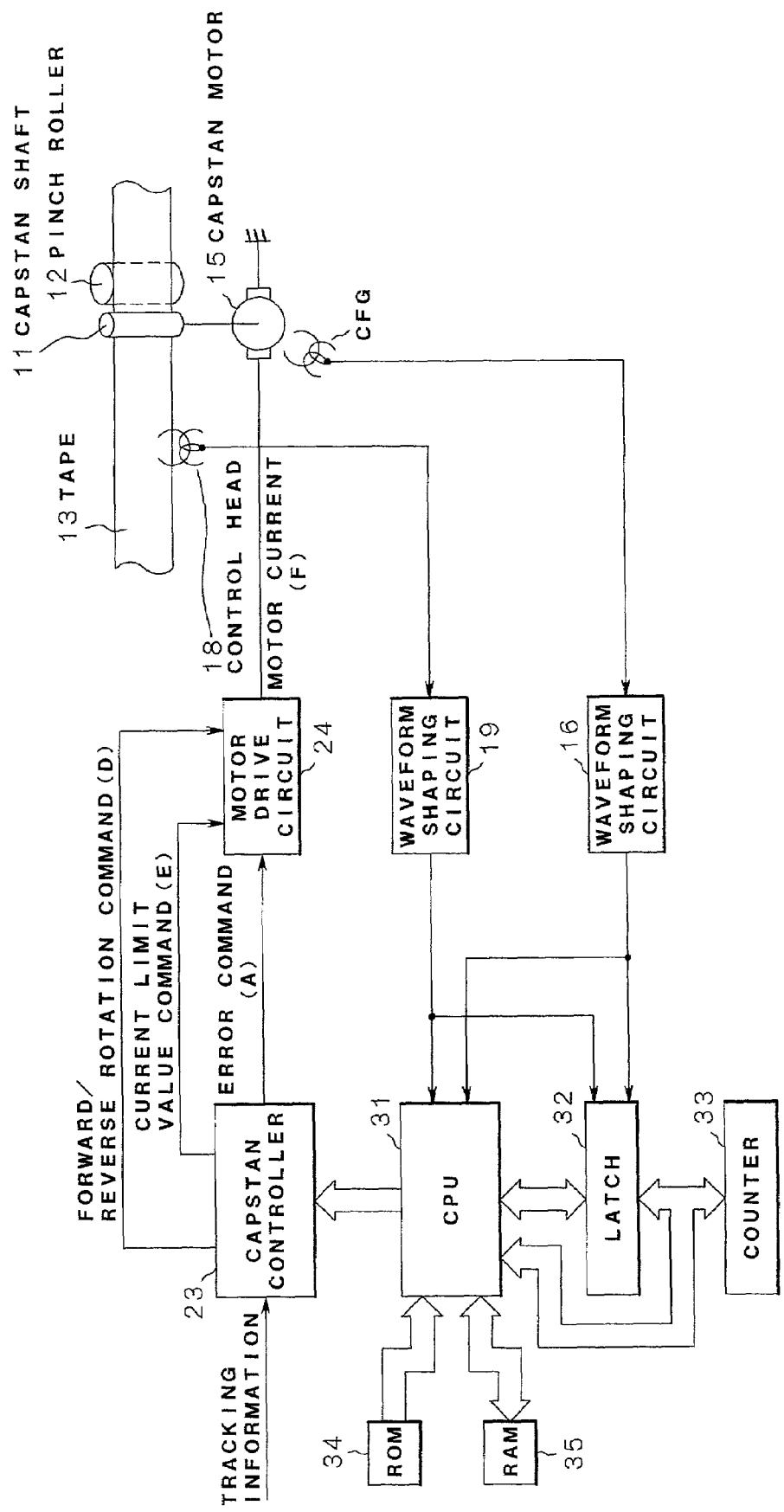
FIG. 1 is a block diagram showing an embodiment of an intermittent drive control apparatus of a motor according to the present invention.
Figure 3:
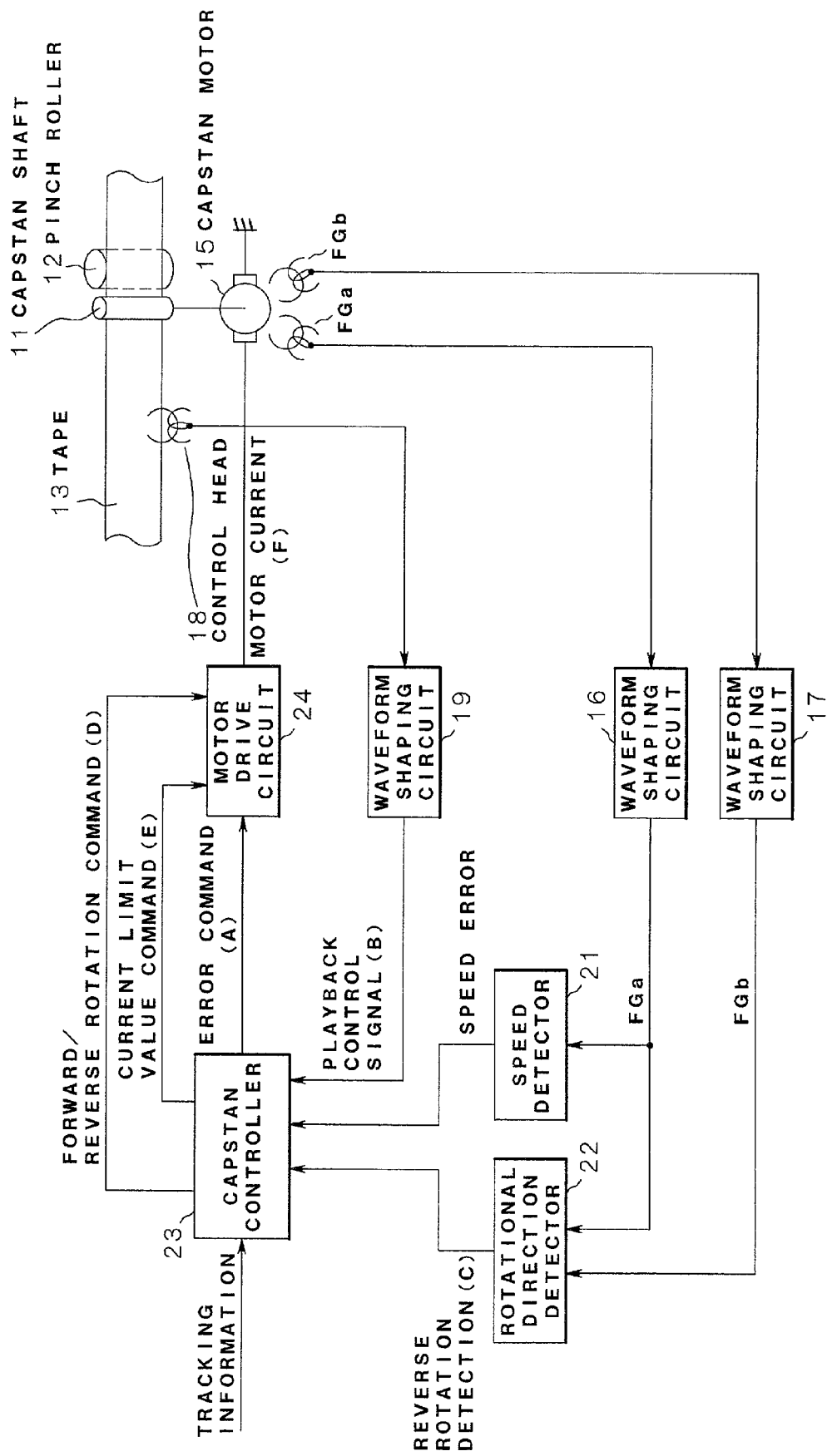
FIG. 3 is a block diagram showing a related technique.

Hereafter, an embodiment of the present invention will be described in detail by referring to drawing. Referring now to the drawings, wherein like reference numerals designate identical or corresponding parts throughout the several views, and more particularly to FIG. 1 thereof, FIG. 1 is a block diagram showing an embodiment of an intermittent drive control apparatus of a motor according to the present invention. In FIG. 1, the same components as those of FIG. 3 are denoted by like characters.

A capstan shaft 11 of the VTR is formed so as to be capable of pressing magnetic tape 13 against a pinch roller 12 and driving the magnetic tape 13 to make it travel. The capstan shaft 11 is integral with a rotary shaft of the capstan motor 15.

In the present embodiment, only a frequency detector CFG of one system is used in order to detect the rotation of the capstan motor 15. The frequency detector CFG is a coil disposed, for example, near the capstan motor 15. The frequency detector CFG is configured so as to detect the rotation of the capstan motor 15 and output detection outputs at a frequency which is proportionate to the rotation speed to a waveform shaping circuit 16. The waveform shaping circuit 16 conducts waveform shaping on the inputted detection output to yield a rectangular wave. The rectangular wave is outputted to a CPU 31 and a latch 32 as a rotation detection signal CFG.

On the other hand, a control head 18 is disposed in such a position as to be opposed to a control track of the tape 13. The control head 18 conducts recording and playback of a control signal on the control track of the tape 13. A reproduced control signal fed from the control head 18 is supplied to a waveform shaping circuit 19. The waveform shaping circuit 19 conducts waveform shaping on the control signal to yield a rectangular wave. The rectangular wave is outputted to the CPU 31 and the latch 32.

The latch 32 latches a count value of a counter 33 at timing of a rising edge and/or a falling edge of the signals fed from the waveform shaping circuits 16 and 19, and outputs to the CPU 31. The counter 33 is controlled by the CPU 31 and counts clock pulses at a predetermined frequency. The CPU 31 derives the rotational speed of the capstan motor 15 on the basis of various inputted signals, and derives the start time interval, fixed speed time interval, braking time interval, re-acceleration time interval, and so on in intermittent drive control. A program to be used by the CPU 31 to conduct processing is stored in a ROM 34. The CPU 31 functions on the basis of this program, and conducts various processing by using a RAM 35 as a memory for working. A capstan controller 23, the CPU 31, the latch 32, the counter 33, the ROM 34, and the RAM 35 form a microcomputer.

Every time the rotation detection signal CFG arrives, the CPU 31 makes the latch 32 latch the count value of the counter 33 and makes the RAM 35 store the latched value. By deriving a difference between count values corresponding to two measured rotation detection signals CFG, the CPU 31 calculates a period of the rotation detection signal CFG. As a result, the CPU 31 can acquire the rotation speed of the motor 15.

A reference value of the period of the rotation detection signal CFG at the time of ordinary operation is stored in the ROM 34. At the time of ordinary operation, the CPU 31 compares the period of the calculated rotation detection signal CFG with the reference value read out from the ROM 34, and derives an error signal. The CPU 31 is formed so as to output motor control information for conducting rotation control of the motor to the capstan controller 23, on the basis of the error signal.

The CPU 31 is formed so as to obtain the count value corresponding to the period of the rotation detection signal CFG at the time of ordinary operation, from the counter 33 and store the count value in the RAM 35.

Furthermore, in the present embodiment, the CPU 31 is formed so as to conduct computation of the braking time interval required at the time of intermittent drive, by using only the detection signal CFG of one system. For example, the CPU 31 is formed so as to derive the period of the rotation detection signal CFG on the basis of the count value each time at least three rotation detection signals CFG arrive, calculate an average rotational speed of the capstan motor 15 on the basis of the derived period, derive an attenuation value of the rotation speed (a speed deceleration rate) on the basis of the calculated average speed, and thereby set the braking time.

Furthermore, for example, the CPU 31 reads out the count value indicating the rotation detection signal period at the time of ordinary operation from the ROM 35, regards this value as the speed of the capstan motor 15 at the time of braking start, derives a difference between the speed of the capstan motor 15 at the time of braking start and the period of the rotation detection signal CFG measured after the braking start, derives the attenuation value of the rotational speed therefrom, and sets a braking interval.

By using various computation results and the control signal fed from the waveform shaping circuit 19, the CPU 31 generates the motor control information for controlling the capstan motor 15.

Tracking information pieces fed from an external memory, an adjustment circuit, and so on (not shown) are also inputted to the capstan controller 23. On the basis of the motor control information fed from the CPU 31, the capstan controller 23 generates a forward/reverse rotation command (D) from the capstan motor 15, a current limit value command (E), and an error command (A), and outputs them to a motor drive circuit 24. The motor drive circuit 24 is formed so as to generate a motor current (F) for driving the capstan motor 15 on the basis of various commands inputted thereto.

Figure 2:
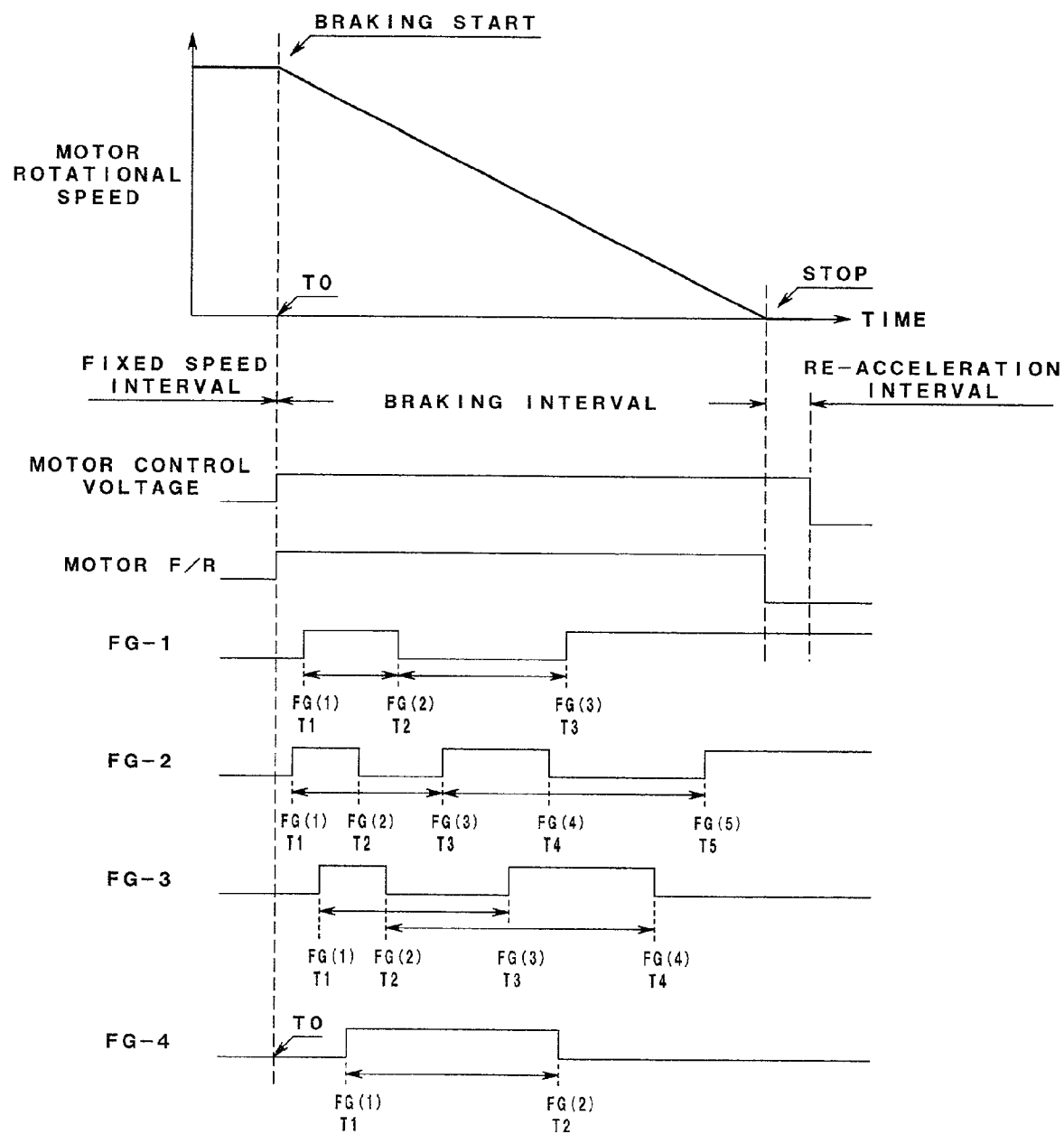
FIG. 2 is a timing chart showing operation of the embodiment of FIG. 1.

Operation of the embodiment having the configuration heretofore described will now be described by referring to a timing chart of FIG. 2. The top of FIG. 2 shows a change of the rotational speed of the motor in the braking interval and re-acceleration interval. The axis of abscissas indicates time. The axis of ordinates indicates the rotational speed of the motor. In association with therewith, a motor control voltage, a forward/reverse rotation command (motor F/R), and the rotation detection signal CFG (FG-1 to FG-4) are shown.

It is now assumed that intermittent drive is conducted for slow playback. In the present embodiment as well, operation in the start interval, fixed speed interval, and re-acceleration interval is the same as the example of the related technique of FIG. 3. In other words, in the start interval, the CPU 31 controls the capstan controller 23 to make the motor current (F) a fixed value so as to raise the rotation of the capstan motor 15 at desired acceleration. As a result, the motor speed (G) of the capstan motor 15 rises at fixed acceleration.

Rotation of the capstan motor 15 is detected by the frequency detector CFG. The detection signal CFG is inputted to the CPU 31 via the waveform shaping circuit 16. The latch 32 latches the count value of the counter 33 at timing of each detection signal (FG(1) to (5)) and supplies the latched value to the CPU 31. When the detection signal CFG fed from the wave form shaping circuit 16 is supplied, the CPU 31 enters an interrupt processing routine, acquires a count value latched so as to correspond to each detection signal (FG(1) to (5)), and calculates the rotation speed of the capstan motor 15 from a difference between count values.

Upon detecting that the rotation speed of the capstan motor 15 has arrived at a desired value W0, the CPU 31 conducts rotational speed control in order to keep the fixed speed. As a result, the capstan controller 23 supplies the error command information (A) to the motor drive circuit 24, changes the motor current, and shifts the motor into a fixed speed state.

The CPU 31 detects the frequency of the detection signal CFG, and conducts speed control so as to make the detected frequency fixed. If the reproduced control signal (B) is inputted from the waveform shaping circuit 19 in the fixed speed interval, the CPU 31 makes the speed W0 kept further for a time interval (TD) on the basis of the tracking information, and then sends an order to the capstan controller 23 so as to cause a shift to braking operation.

Upon reaching start timing (timing T0 of FIG. 2) of the braking interval, the capstan controller 23 inverts the forward/reverse rotation command (MOTOR F/R in FIG. 2) supplied to the motor drive circuit 24 and thereby switches the motor current over to the opposite direction. In this case, the capstan controller 23 prescribes the motor current (F) so as to decrease the rotational speed of the motor at a fixed rate, on the basis of the output of the CPU 31.

As shown in FIG. 2, the rotational speed of the capstan motor 15 decreases at fixed rate and stops when a predetermined time interval has elapsed. If braking operation were kept after the stop timing, the motor 15 would conduct reverse rotation. At the same time that the rotation of the motor 15 stops, the CPU 31 inverts the motor F/R (see FIG. 2) to order the forward rotation. In order to cancel the rotational inertia of the motor 15, the CPU 31 thus supplies the motor current for a minute interval (re-acceleration interval).

In the example of the related technique of FIG. 3, stop timing of the motor 15 is detected by start of the reverse operation of the capstan motor 15, as described above. On the other hand, in the present embodiment, the CPU 31 calculates the time interval (braking time interval) between the start of the braking interval and stop of the motor 15. Thereby, the stop timing of the motor 15 is derived.

Calculation of the braking time interval in the present embodiment will now be described.

The CPU 31 computes the speed deceleration rate of the rotational speed of the motor 15 by using the detection signal CFG in the braking interval and thereby obtains the braking time interval.

First, the speed deceleration rate in the braking interval will be described. In the braking interval, the motor current is fixed as described above.

An equilibrium equation of the motor torque is represented by the following equation (1), $$J(d\omega/dt)+D\omega+TL=KT \cdot i \quad (1)$$

where
 $\omega$=angular speed of motor rotation
 J=motor inertia
 D=coefficient of viscosity of motor
 KT=motor torque constant
 TL=motor load torque
 i=motor current In the braking interval, the motor current is fixed. Letting i=I (fixed) and solving the equation (1), therefore, we get $$\omega(t) = \left[\omega(0) - \frac{B}{A}\right]e^{-AT} + \frac{B}{A} \quad (2)$$

where
 $\omega(0)$ initial value of the number of rotations of motor
 A=D/J
 B=(KT·I−TL)/J In general, the motor time constant is longer than the braking time interval of the VTR at the time of slow motion (At<<1). Therefore, $e^{-AT}$ can be approximated as (1−At). In the equation (2), $\omega(t)$ is approximated by the following equation (3).

$$\omega(t)=\omega(0)+[B-A \cdot \omega(0)]t \quad (3)$$

The equation (3) represents that the number of rotations of the motor is proportionate to time. In other words, in the case where the motor current (braking current) is fixed and the load from the traveling system is fixed (the same load), the speed decreases at a fixed rate. In other words, the speed deceleration rate is fixed in the braking interval.

In the present embodiment, the braking time interval is computed by utilizing the fact that the speed deceleration rate is fixed. The CPU 31 calculates the speed deceleration rate by measuring the input period of the rotation detection signal CFG of the capstan motor 15 in the braking interval.

By the way, in the above described related technique of FIG. 3, the braking time interval is made fixed by controlling the value of a current supplied to the motor, in order to make the tape feed fixed in the braking interval. However, the influence of dispersion of the load or the like on screen noise is comparatively slight. In the present embodiment, therefore, the current supplied to the motor is made fixed irrespective of the dispersion of the load or the like. Even in the case where the braking interval differs from load to load, the braking time interval is derived certainly by utilizing the fact that the speed deceleration rate is fixed.

A concrete calculation method of the speed deceleration rate will now be described. The CPU 31 replaces the rotational speed of the motor 15 by the frequency of the rotation detection signal CFG, and conducts computation.

It is now assumed that, for example, three rotation detection signals CFG (FG(1), FG(2) and FG(3)) are detected in the braking interval as represented by FG-1 of FIG. 2.

The CPU 31 calculates an average frequency S(1−2) of the detection signal CFG between time T1 when the detection signal FG(1) occurs and time T2 when the detection signal FG(2) occurs, by measuring the period of the detection signals FG(1) and FG(2). The average frequency S(1−2) is given by the following equation (4), $$S(1-2)=\{1/T(1-2)\}(Hz) \quad (4)$$

where T(1−2) indicates a time interval between the time T1 and the time T2.

In the same way, the CPU 31 calculates an average frequency S(2−3) between the time T2 and time T3, by measuring the period of the detection signals FG(2) and FG(3). The average frequency S(2−3) is given by the following equation (5), $$S(2-3)=\{1/T(2-3)\}(Hz) \quad (5)$$

where T(2−3) indicates a time interval between the time T2 and the time T3.

Subsequently, the CPU 31 derives a frequency decrease rate ka by the following equation (6).

$$ka=\{S(1-2)S-(2-3)\}[\{T(1-2)/2+T(2-3)/2\}](Hz/\text{second}) \quad (6)$$

The CPU 31 derives the braking time interval between the braking start and the motor stop, by using the calculated frequency decrease rate (speed deceleration rate). In other words, letting the rotation detection signal frequency at the time of braking start be S(0), the CPU 31 calculates such a braking time interval Ba that the frequency S(0) becomes 0, by using the following equation (7).

$$Ba=S(0)/ka(\text{seconds}) \quad (7)$$

By the way, until a predetermined number of detection signals of CFG have been inputted, the CPU 31 cannot execute the above described computations for calculating the speed deceleration rate. Before the predetermined number of detection signals of CFG have been inputted, therefore, the CPU 31 makes the braking interval start, by using the braking time interval derived by the preceding braking processing as a temporary time interval.

For example, in the example of FG-1 of FIG. 2, the CPU 31 makes braking started on the basis of the braking time interval calculated the last time, before three signals of CFG are inputted. After three detection signals of CFG have been inputted, the CPU 31 calculates the braking time interval by using the above described computations, subtracts an elapsed time interval after start of the braking interval from the calculated braking time interval, and resets a resultant time interval as the braking time interval.

If the braking time interval is finished, the CPU 31 conducts re-acceleration for a fixed time interval in order to reduce the after shock of the rotation of the motor 15. In order to conduct this re-acceleration processing, the CPU 31 makes the braking time interval longer than the value derived from the speed deceleration rate by a fixed time interval.

In the above described computation of the speed deceleration rate, the example in which three detection signals of CFG are generated in the braking interval. The number of the detection signals of CFG detected in the braking interval varies according to setting of the play back speed. In the present embodiment, computation of the speed deceleration rate is possible irrespective of the number of detected signals of CFG.

For example, FG-2 of FIG. 2 shows an example in which a large number of signals (FG(1) to FG(5)) of CFG are inputted in the braking interval. In this case as well, the CPU 31 calculates an average frequency $$S(1-3)=\{1/T(1-3)\}(Hz) \tag{8}$$

between time T1 and time T3, by measuring a period of the detection signals FG(1), FG(2), FG(3), FG(4) and FG(5) in the same way as the case of FG-1.

T(1–3) is a time interval between the time T1 and the time T3.

In addition, the CPU 31 calculates an average frequency S(3–5) between the time T3 and time T5 according to the following equation (9), by measuring a period of FG(3), FG(4) and FG(5).

$$S(3-5)=\{1/T(3-5)\}(Hz) \tag{9}$$

T(3–5) is a time interval between the time T3 and the time T5.

A frequency decrease rate kb is calculated by the following equation (10).

$$kb=\{S(1-3)S-(3-5)\}/[\{T(1-3)/2+T(3-5)/2\}](Hz/second) \tag{10}$$

Assuming that a rotation detection signal frequency at the time of braking start is S(0), such a braking time interval Bb that the frequency S(0) becomes 0 is given by the following equation (11).

$$Bb=S(0)/kb(seconds) \tag{11}$$

FG-3 of FIG. 2 represents an example of the case where the number of detection signals of CFG used in computation of the speed deceleration rate is increased in the case where the number of inputted rotation detection signals of CFG is insufficient. In the braking interval, four rotation detection signals of CFG (FG(1) to FG(4)) are inputted to the CPU 31.

First, the CPU 31 calculates an average frequency $$S(1-3)=\{1/T(1-3)\}(Hz) \tag{12}$$

between time T1 and time T3, by measuring a period of the detection signals FG(1), FG(2) and FG(3).

Subsequently, the CPU 31 calculates an average frequency S(3–5) between time T2 and time T4 according to the following equation (13), by measuring a period of detection signals FG(2), FG(3) and FG(4).

$$S(2-4)=\{1/T(2-4)\}(Hz) \tag{13}$$

T(2–4) is a time interval between the time T2 and the time T4.

A frequency decrease rate kc is calculated by the following equation (14).

$$kc=\{S(1-3)S-(2-4)\}/[\{T(1-3)/2+T(2-4)/2\}](Hz/second) \tag{14}$$

Assuming that a rotation detection signal frequency at the time of braking start is S (0), such a braking time interval Bc that the frequency S(0) becomes 0 is given by the following equation (15).

$$Bc=S(0)/kc(seconds) \tag{15}$$

FG-4 of FIG. 2 represents an example of the case where the frequency of the rotation detection signal CFG at the time of start of the braking interval is low (i.e., the rotational speed of the motor 15 is slow) and only two rotation detection signals of CFG are inputted to the CPU 31 in the braking interval. In this case, the CPU 31 can measure the speed only at one point. Therefore, the CPU 31 substitutes the rotation detection signal frequency at the time of start of the braking interval for another point.

In the braking interval, two rotation detection signals of CFG (FG(1) and FG(2)) are inputted to the CPU 31. The CPU 31 calculates an average frequency $$S(1-2)=\{1/T(1-2)\}(Hz) \tag{16}$$

between time T1 and time T2, by measuring a period of the detection signals FG(1), FG(2) and FG(3).

For calculating the frequency decrease rate, it is necessary to derive an average speed at another point. Therefore, the CPU 31 utilizes the rotation detection signal frequency S(0) at the time of start of the braking interval. As a result, calculation of the braking time interval becomes possible even in the case where the number of detection signals of CFG is two.

In other words, the CPU 31 calculates the frequency decrease rate kd by using the following equation (17), $$kd=\{S(0)-S-(1-2)\}/[\{T(0-1)+T(1-2)/2\}](Hz/second) \tag{17}$$

where T(0–1) is a time interval between the time T0 and the time T1.

A braking time interval Bd is calculated by using the following equation (18).

$$Bd=S(0)/kd(seconds) \tag{18}$$

Furthermore, considering the tension of a reel drive belt included in the traveling system of tape and inertial of the reel, more reliable tape drive becomes possible by slightly prolonging the time interval of the reverse rotation in the braking time interval. In other words, a braking time interval longer than each of the above described computation results of the braking time interval by, for example, approximately 2 ms may be set.

In the case where only two rotation detection signals of CFG are inputted to the CPU 31 in the braking interval (as in the example of FG-4 of FIG. 2), the CPU 31 utilizes the rotation detection signal frequency at the time of start of the braking interval for computation of the braking time interval, as described above. In this case, the speed in the fixed speed interval is already known. As a matter of fact, therefore, it is not necessary to measure the rotation detection signal frequency at the time of start of the braking interval, but a preset value of speed in the fixed speed interval can be used.

In the case where the playback speed is extremely slow (for example, at the time of playback of tape recorded in the VHS-VP mode (five-times-recording mode)), however, speed control becomes difficult sometimes. A stable speed is not always obtained in the fixed speed interval. In this case, further higher accuracy can be obtained by measuring the rotational detection signal frequency at the time of start of the braking interval, instead of using the preset value of the speed in the fixed speed interval.

In other words, in this case, the rotation detection signal frequency is measured at arbitrary timing immediately before the start of the braking interval. The measured rotation detection signal frequency can be used as the rotation detection signal frequency at the time of start of the braking interval.

In the present embodiment, the braking time interval is thus derived by calculating the speed deceleration rate in the braking interval on the basis of the frequency of the rotation detection signal. Even in the case where one rotation detection signal is used, reliable intermittent drive control is possible. It is not necessary to conduct zero point detection using two rotation detection signals differing in phase. The rotation of the capstan motor can be detected by using a rotation detector of one system. As a result, the apparatus scale can be reduced and the cost can be lowered.

In the present embodiment, various computations for controlling the rotation of the capstan motor including the computation of the braking time interval are executed by software processing using a microcomputer. It is apparent that these computations may be implemented by using hardware such as a braking time interval computing device.

Numerous modifications and variations of the present invention are possible in light of the above teachings. It is therefore to be understood that within the scope of the appended claims, the invention may be practiced otherwise than as specifically described herein.

What is claimed is:

1. An intermittent drive control apparatus of a motor comprising:
    motor drive means capable of driving a motor intermittently by selectively supplying current of a forward rotation direction and current of a reverse rotation direction to the motor;
    rotation detection means which generate rotation detection signals at a frequency proportionate to rotation of the motor; and
    braking time calculation means which, when the motor drive means is controlled to supply the current of the forward rotation direction and the current of the reverse rotation direction to the motor, thereby braking and stopping the rotation of the motor, measures a period of the rotation detection signals to calculate a speed deceleration rate of the motor, and calculate a braking time between braking start and stop of the rotation of the motor based on a rotational speed of the motor at time of the braking start and the calculated speed deceleration rate, so that the motor drive means is controlled based on the calculated braking time.

2. An intermittent drive control apparatus of a motor according to claim 1, wherein
    the braking time calculation means calculates the speed deceleration rate based on the period of the plurality of rotation detection signals, and
    until the plurality of rotation detection signals are obtained, the motor drive means is controlled based on a braking time interval calculated last time.

3. An intermittent drive control apparatus of a motor according to claim 1, wherein
    the braking time calculation means measures a first period based on a first rotation detection signal included in the rotation detection signals and a second rotation detection signal arriving subsequently to the first rotation detection signal, measures a second period based on the second rotation detection signal and a third rotation detection signal arriving subsequently to the second rotation detection signal, and calculates the speed deceleration rate based on the first period and the second period.

4. An intermittent drive control apparatus of a motor according to claim 1, wherein
    the braking time calculation means obtains the speed deceleration rate by calculating an average speed of each pair among a plurality of pairs of the rotation detection signals.

5. An intermittent drive control apparatus of a motor according to claim 1, wherein
    the braking time calculation means uses a rotational speed of the motor at time of braking start as one of average speeds used for calculation of the speed deceleration rate.

6. An intermittent drive control apparatus of a motor according to claim 4, wherein
    the braking time calculation means calculates first and second average speeds based on first and second detection signal pairs which are not consecutive in a sequence of the rotation detection signals, calculates the speed deceleration rate based on the first and second average speeds, and calculates a plurality of average speeds by using one rotation detection signal occurring between rotation detection signals forming the first detection signal pair as one of rotation detection signals of the second detection signal pair.

7. An intermittent drive control apparatus of a motor according to claim 4, wherein
    the braking time calculation means uses a rotational speed of the motor at time of braking start as one of average speeds used for calculation of the speed deceleration rate.

8. An intermittent drive control apparatus of a motor according to claim 1, further comprising:
    braking time correction means for setting the braking time interval equal to a value which is longer than the time calculated by the braking time calculation means by a predetermined time interval, when re-supplying a current of the same rotation direction as that before braking start, after stop of the motor.

9. An intermittent drive control apparatus of a motor, comprising:
    a motor configured to drive the motor intermittently by selectively supplying a current into the motor in a forward rotation direction and a current in a reverse rotation direction;
    a rotation detector which generates a rotation detection signal at a frequency proportionate to rotation of said motor;
    a rotational speed detector to obtain a rotational speed of said motor based on said rotation detection signal; and
    a driving controller configured to control the motor to supply current of a reverse rotation direction to the motor for a predetermined period of time, thereby braking and stopping the rotation of the motor,
    wherein said driving controller includes a braking time interval calculator configured to calculate a time interval of said braking,
    said braking time interval calculator measures a period of said rotation detection signal to calculate a speed deceleration rate of said motor, and calculates a braking time between start and stop of the rotation of the motor based on a rotational speed of the motor at the time of the braking start and the calculated speed deceleration rate, and
    said driving controller controls the motor so that current of a reverse rotation direction may be supplied to the motor during the calculated time.

10. An intermittent drive control apparatus of a motor according to claim 9, wherein
    the braking time interval calculator calculates the speed deceleration rate based on the period of the plurality of rotation detection signals, and until the plurality of rotation detection signals are obtained, the motor is controlled based on a braking time interval calculated last time.

11. An intermittent drive control apparatus of a motor according to claim 9, wherein
the braking time interval calculator measures a first period based on a first rotation detection signal included in the rotation detection signals and a second rotation detection signal arriving subsequently to the first rotation detection signal, measures a second period based on the second rotation detection signal and a third rotation detection signal arriving subsequently to the second rotation detection signal, and calculates the speed deceleration rate based on the first period and the second period.

12. An intermittent drive control apparatus of a motor according to claim 9, wherein
the braking time interval calculator obtains the speed deceleration rate by calculating an average speed of each pair among a plurality of pairs of the rotation detection signals.

13. An intermittent drive control apparatus of a motor according to claim 9, wherein
the braking time interval calculator uses a rotational speed of the motor at time of braking start as one of average speeds used for calculation of the speed deceleration rate.

14. An intermittent drive control apparatus of a motor according to claim 12, wherein
the braking time interval calculator calculates first and second average speeds based on first and second detection signal pairs which are not consecutive in a sequence of the rotation detection signals, calculates the speed deceleration rate based on the first and second average speeds, and calculates a plurality of average speeds by using one rotation detection signal occurring between rotation detection signals forming the first detection signal pair as one of rotation detection signals of the second detection signal pair.

15. An intermittent drive control apparatus of a motor according to claim 12, wherein
the braking time interval calculator uses a rotational speed of the motor at time of braking start as one of average speeds used for calculation of the speed deceleration rate.

16. An intermittent drive control apparatus of a motor according to claim 9, further comprising:
a braking time interval corrector for setting the braking time interval equal to a value which is longer than the time calculated by the braking time interval calculator by a predetermined time interval, when re-supplying a current of the same rotation direction as that before braking start, after stop of the motor.

* * * * *